United States Patent
Birrell et al.

(10) Patent No.: US 8,930,961 B2
(45) Date of Patent: Jan. 6, 2015

(54) AUTOMATIC MUTUAL EXCLUSION

(71) Applicant: Microsoft Corporation, Redmond, WA (US)

(72) Inventors: Andrew David Birrell, Los Altos, CA (US); Michael Acheson Isard, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/906,809

(22) Filed: May 31, 2013

(65) Prior Publication Data
US 2013/0262789 A1 Oct. 3, 2013

Related U.S. Application Data

(63) Continuation of application No. 11/763,964, filed on Jun. 15, 2007, now Pat. No. 8,458,724.

(51) Int. Cl.
| | |
|---|---|
| G06F 3/00 | (2006.01) |
| G06F 13/28 | (2006.01) |
| G06F 9/45 | (2006.01) |
| G06F 12/14 | (2006.01) |
| G06F 9/30 | (2006.01) |
| G06F 9/38 | (2006.01) |
| G06F 9/46 | (2006.01) |

(52) U.S. Cl.
CPC .............. *G06F 12/14* (2013.01); *G06F 9/3004* (2013.01); *G06F 9/3834* (2013.01); *G06F 9/467* (2013.01)
USPC ............................ 719/312; 711/141; 717/140

(58) Field of Classification Search
CPC ............ G06F 11/2074; G06F 11/2076; G06F 11/2082; G06F 11/2097; G06F 15/16; G06F 17/30578; G06F 8/456; G06F 11/3632; H04L 12/422
See application file for complete search history.

(56) References Cited

U.S. PATENT DOCUMENTS

| | | | |
|---|---|---|---|
| 5,579,505 | A | 11/1996 | Ohkami |
| 5,692,193 | A | 11/1997 | Jagannathan et al. |

(Continued)

OTHER PUBLICATIONS

Harris, T. et al., "Language Support for Lightweight Transactions", Oopsla, 2003, 388-402, http://delivery.acm.org.

(Continued)

*Primary Examiner* — Tuan Dao
(74) *Attorney, Agent, or Firm* — Miia Sula; Micah Goldsmith; Micky Minhas

(57) ABSTRACT

An automatic mutual exclusion computer programming system is disclosed which allows a programmer to produce concurrent programming code that is synchronized by default without the need to write any synchronization code. The programmer creates asynchronous methods which are not permitted make changes to shared memory that they cannot reverse, and can execute concurrently with other asynchronous methods. Changes to shared memory are committed if no other thread has accessed shared memory while the asynchronous method executed. Changes are reversed and the asynchronous method is re-executed if another thread has made changes to shared memory. The resulting program executes in a serialized order. A blocking system method is disclosed which causes the asynchronous method to re-execute until the blocking method's predicate results in an appropriate value. A yield system call is disclosed which divides asynchronous methods into atomic fragments. When a yield method call is made, shared memory changes are committed if possible or reversed and the atomic fragment is re-executed.

20 Claims, 4 Drawing Sheets

(56) References Cited

U.S. PATENT DOCUMENTS

| | | |
|---|---|---|
| 5,922,057 A | 7/1999 | Holt |
| 6,199,094 B1 | 3/2001 | Presler-Marshall |
| 6,427,235 B1 | 7/2002 | Kosche et al. |
| 6,449,614 B1 | 9/2002 | Marcotte |
| 6,629,152 B2 | 9/2003 | Kingsbury et al. |
| 6,662,364 B1 | 12/2003 | Burrows et al. |
| 6,697,834 B1 | 2/2004 | Dice |
| 6,829,609 B1 | 12/2004 | Wagner |
| 7,779,411 B2 | 8/2010 | Cox |
| 7,823,170 B2 | 10/2010 | Jolfaei |
| 8,458,724 B2 | 6/2013 | Birrell et al. |
| 2002/0087736 A1 | 7/2002 | Martin |
| 2002/0174258 A1 | 11/2002 | Dale et al. |
| 2004/0117793 A1 | 6/2004 | Shaylor |
| 2004/0252709 A1 | 12/2004 | Fineberg |
| 2005/0050528 A1* | 3/2005 | Wang .................. 717/148 |
| 2005/0240930 A1 | 10/2005 | Amamiya et al. |
| 2006/0085591 A1* | 4/2006 | Kumar et al. ............. 711/113 |
| 2006/0136930 A1* | 6/2006 | Kaler et al. .............. 718/105 |
| 2006/0161740 A1 | 7/2006 | Kottapalli et al. |
| 2006/0265704 A1* | 11/2006 | Holt ....................... 717/169 |
| 2007/0156780 A1* | 7/2007 | Saha et al. ............... 707/202 |
| 2007/0156969 A1* | 7/2007 | Tian et al. ............... 711/141 |
| 2007/0288931 A1 | 12/2007 | Avkarogullari |
| 2008/0005737 A1* | 1/2008 | Saha et al. ............... 718/100 |

OTHER PUBLICATIONS

Herlihy, M. et al., "Software Transactional Memory for Dynamic-Sized Data Structures", PODC, 2003, 10 pages, www.cs.rochester.edu.

Welc, A. et al., "Transparently Reconciling Transactions with Locking for Jave Synchronization", ECOOP, 2006, 148-173, www.cs.purdue.edu.

"Cooperative Aysnchronous Update of Shared Memory", Bogdan Chlebus, 2005, pp. 1-7.

"Efficient Software Implementation of Embedded Communication Protocol Controllers using Asynchronous Software Thread Integration with Time and Space Efficient Procedure Calls", Nagendra Kumar, Feb. 2007, pp. 1-34.

"A Shared Memory Module for Asynchronous Arrays of Processors", Michael Meeuwsen, Mar. 2007, pp. 1-13.

"Efficient Object Sharing in Shared Memory Multiprocessors", Mark Moir, 1996, pp. 1-276.

MTIO A Multi-Threadd Parallel I/O System, Sachin More, 1997, pp. 1-6.

* cited by examiner

AUTOMATIC MUTUAL EXCLUSION

CROSS REFERENCE TO RELATED APPLICATIONS

This application is a continuation of, and claims priority to, U.S. patent application Ser. No. 11/763,964, filed Jun. 15, 2007, now U.S. Pat. No. 8,458,724, issued Jun. 4, 2013, entitled "Automatic Mutual Exclusion," the entire contents of which are hereby incorporated herein by reference.

BACKGROUND

As computers become faster and more powerful, and multiprocessor computers become more common, the use of concurrent programming will grow. Concurrent programs are the result of the desire to have the computer continue useful program execution while a part of the program is unable to make progress due to some delay, such as waiting for a response from a peripheral device like a hard drive. The separate parts of a computer program executing simultaneously (typically known as threads) often access and manipulate the same data located in shared memory space. When two or more threads manipulate a single, shared piece of data, several problems may occur, including race conditions, deadlock, and incorrect results. Threads can be synchronized through good management of shared memory, which can eliminate many of these problems, but writing the code to do so is very difficult even for experienced programmers. Therefore, the benefits of concurrent programming, such as increased efficiency and reduced execution time, are often greatly diminished due to poor management of shared memory.

Several methods have developed for better handling of shared memory. This helps to synchronize multiple threads and ensures that correct results are generated while maximizing the benefits of concurrent programming Mutual exclusion, or mutex, is one such method. Mutex may take several forms, including disabling interrupts while the portion of the code using the shared data executes, and using flags, locks or semaphores to indicate that shared data is in use. This prevents other threads from manipulating the data.

Shared data may also be handled with transactional memory, a mechanism that allows access to the shared data by all threads, but records every read and write of data in a log. When a thread completes a transaction using the shared data, it verifies with the log that no other thread has made changes to the data while the thread was manipulating it. If the data has not been altered by another thread, the changes are committed. If the shared data has been affected by another thread, the thread may abort the transaction, reverse any changes it has made, and re-execute the transaction from the beginning. Alternatively, when more than one thread has modified shared data and the conflict is detected before changes are committed, a decision may be made about which threads should be aborted and which will be allowed to commit its changes. Various other means and methods of implementing transactional memory are known to those skilled in the art.

While these methods and others can be effective at managing shared memory and data, it is very difficult to employ them properly so that the benefits of concurrent programming are fully realized. Often, failure to skillfully use shared memory management mechanisms results in worse performance or incorrect results. Effective use of concurrent programming requires the programmer to think about concurrency in every aspect of the program and address the many possible side effects of improper shared memory use. Programmers will also want to maximize the efficiency of the concurrent program, which often means minimizing the use of shared data management tools. This may leave significant amounts of data unprotected from concurrent programming problems. Moreover, as programs evolve and are modified during their lifespan, the mechanisms put in place initially to optimize the use of shared data may be modified or may no longer be effective, resulting in a program that does not perform as designed. Writing good concurrent programs that ensure thread synchronization and proper use of shared memory, and maintain those qualities through their lifespan, is a daunting challenge for even the most experienced programmers.

SUMMARY

In an automatic mutual exclusion programming model, a method of executing software utilizing shared memory space is provided to facilitate creation of code that is synchronized and properly manages shared memory. The system uses blocks of code, referred to as asynchronous methods. Asynchronous methods may be executed concurrently but are correctly synchronized, guaranteeing that the program execution is equivalent to execution of the asynchronous method calls in some serialized order. When an asynchronous method is called, the program is not permitted to take actions that produce results that the automatic mutual exclusion system cannot reverse. Examples of nonreversible actions include input and output activities. Such activities may be deferred until the asynchronous method call completes. Serialization and synchronization of shared memory may be obtained by executing each asynchronous method call as a transactional memory transaction.

Rather than using commonly known synchronization mechanisms, asynchronous method calls and automatic mutual exclusion system calls of several types are used, allowing the user to write the program as a set of atomic blocks or fragments. This lets the programmer use a model of serialized execution, greatly simplifying the process of creating a concurrent program. All shared memory and data is implicitly protected unless otherwise specified. Where unsynchronized, non-atomic code is required, the programmer explicitly defines that portion of code as such. The resulting program is correctly synchronized by default. The automatic mutual exclusion system can support purely event-based programming, as well as an enhanced system where atomic blocks are broken up into atomic fragments, allowing for the intervention of other asynchronous method calls within an executing method. The system may decide which method calls or atomic fragments are available for execution, which are queued, and when fragments or method calls should be executed, and other coordinating tasks, as well as communicating with the operating system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Event-Based Automatic Mutual Exclusion

Figure 1:
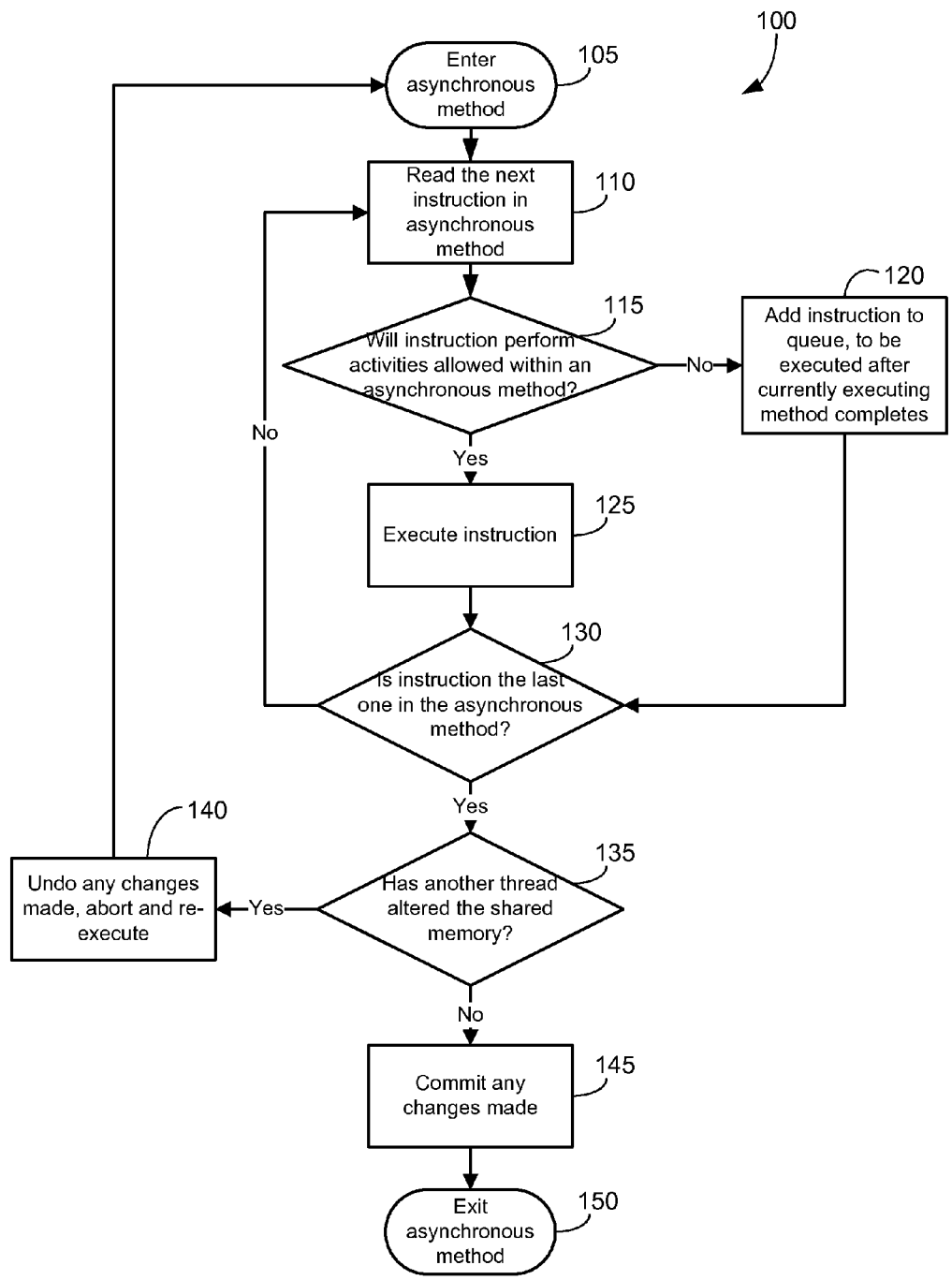
FIG. 1 is a flow diagram of a method of executing an asynchronous method call.

In one embodiment of an automatic mutual exclusion system, running a program consists of executing a set of asynchronous method calls. The automated mutual exclusion system guarantees that the execution of these method calls is equivalent to executing each of them in some serialized order. Concurrency of execution is achieved by overlapping the execution of the method calls. Once all the asynchronous method calls have completed, the program terminates. The programmer writes the code in typical serialized fashion, within asynchronous methods. The automatic mutual exclusion system enforces synchronization, but the programmer doesn't have to write synchronization code, and concurrency of execution is provided where possible. This makes it easier for the programmer to write code that is synchronized and properly manages shared memory.

In one exemplary, non-limiting embodiment, asynchronous methods are created by calling methods using a specific construct to indicate that the method should be executed as an asynchronous method (for example, "async MethodName(MethodArguments)"). In another embodiment, all methods are asynchronous by default. Other means of identifying or indicating that a method is asynchronous are contemplated as within the scope of the present disclosure. Within the asynchronous method, the program is not permitted to take actions that result in side-effects which the automatic mutual exclusion system cannot undo. For instance, if changes are made to shared memory during the execution of an asynchronous method call, those changes must be reversible. Calls to other asynchronous methods may be made within an asynchronous method, but the execution of the other asynchronous method calls is deferred until the initiating asynchronous method makes permanent any changes made to shared memory.

In one embodiment, when the asynchronous method completes execution, a check is made to see if the shared memory has been altered by any other thread. If not, the changes made to shared memory by the asynchronous method are committed, or made permanent in the sense that they will not be reversed by this particular asynchronous method. The changes made to shared memory by the asynchronous method may, of course, be changed further by later threads and asynchronous methods. If the shared memory space has been altered by another thread or asynchronous method while the asynchronous method has been executing, then the changes made by the asynchronous method are reversed, and the method is aborted and re-executed. Alternatively, the system may make a decision about which thread should be allowed to commit, and require others that have affected shared memory to reverse their changes and re-execute. Re-execution may take place immediately, or it may be delayed to allow fair access to shared resources. Threads requiring re-execution may put into queues for later execution. Other methods and means of determining when and if a thread should abort and re-execute or be allowed to commit its changes are contemplated as within the scope of the present disclosure. The process of aborting and re-executing may continue until a successful commit of the changes made by the asynchronous method is achieved. In one embodiment, ensuring the reversibility of shared memory changes may be accomplished through the use of transactional memory.

Transactional memory, which may be implemented in hardware or software, is a mechanism that allows programs to manipulate shared memory while maintaining synchronization. A transaction is a piece of code that reads and/or writes to shared memory. Each thread performing a transaction makes its changes to the shared memory and records the changes in a log. A thread accessing the shared memory space checks the log to see if any changes have been made to the shared memory during its transaction, a process known as validation. In one implementation, if changes have been made by another thread during its transaction, the thread aborts and re-executes the transaction. Alternatively, a decision may be made about which of the threads that modified the shared memory should be allowed to commit, all others aborting and re-executing. Re-execution of aborted threads may be postponed for a period of time to allow other threads fair access to shared resources. If validation is successful (i.e., no changes have been made), the transaction is committed and any changes the thread made become permanent, in the sense that they will not be reversed by the transactional memory system. Of course, the memory alterations performed by the thread may be changed by later transactions. If a thread has to abort a transaction for any reason, any changes it made are reversed. Those skilled in the art will understand the details of transactional memory and recognize the various ways it may be implemented. Other methods and mechanisms of ensuring the reversibility of any actions performed by the asynchronous method that result in changes to shared memory are contemplated as being within the scope of the present disclosure.

Some activities, such as input and output, may be prohibited from occurring within an asynchronous method due to the inability to reverse the results of such activity. If a program needs to perform input or output activities, the input or output request is entered into a queue, and the execution of the input or output operation is deferred until after the current asynchronous method completes. Other activities that are inherently irreversible may be handled in a similar fashion, by deferring their execution or completion until after the calling asynchronous method is complete.

In one embodiment of the automatic mutual exclusion system, the tasks required by the system to function properly are coordinated by the system itself. For instance, the system will schedule method calls and determine which asynchronous method will be executed at which time. The system may also manage and maintain the queues used to run delayed methods calls when those calls have to be re-executed due to an abort. The system may also maintain queues used to manage activities that are not permitted to be performed within an asynchronous method. The system also interacts with the operating system of the device on which it is installed, requesting execution and concurrency from the operating system and resources with which to perform the functions of the automatic mutual exclusion system. Other means and methods of operating and managing memory utilization and program execution are contemplated as within the scope of the present subject matter.

FIG. 1 represents one non-limiting embodiment of the present disclosure, representing asynchronous method 100 under execution. The method is entered in step 105 and the first instruction is read at step 110. The instruction is evaluated at step 115 to see if it is of the type that is permitted to be executed within an asynchronous method. For instance, if this instruction is an input or output instruction that is not allowed to be executed within an asynchronous method, then it is placed in a queue at step 120 to await execution after the method completes. Alternatively, if the instruction is a call to another asynchronous method, it is likewise placed in a queue for execution following completion of asynchronous method 100. If the instruction can be executed within asynchronous method 100, it is executed at step 125. Regardless of whether the instruction was permitted to execute or not, next, at step 130, a determination is made as to whether there are more instructions within the method. If there are more instructions in the method, the next instruction is read, returning to step 110. If there are no more instructions in the method, then shared memory is checked for any changes by other asynchronous methods or threads at step 135. If the shared memory has been altered by another thread since starting execution of the current asynchronous method 100, then any changes made by method 100 are undone and the method 100 execution is aborted at step 140. The asynchronous method 100 is re-executed, returning to step 105. If there were no changes by other threads, then method 100 commits any changes it has made at step 145. Execution of the method 100 is completed at step 150.

Asynchronous method 100 allows the use of shared memory without the risk of races or other potential side-effects of shared memory usage. Concurrency of execution is permitted, while ensuring that a valid serialization of events occurs. Moreover, the code of asynchronous method 100 is executed to completion without the need for the programmer to include any synchronization code. The asynchronous method mechanism synchronizes by default.

Further granularity of synchronization control may be provided by additional system-supplied methods. For instance, in one embodiment, a blocking method is provided that allows the execution of an asynchronous method to completion only if all the executed calls of the blocking method evaluate to "True". A non-limiting example call to such a blocking method may be "BlockUntil(<predicate>)". If the blocking method's predicate evaluates to "True", the blocking method does nothing, allowing execution to proceed. If it evaluates to anything other than "True", it may abort the current asynchronous method and re-execute it. This allows other threads to access the shared memory data, and perhaps take actions that would result in a change of the value of the blocking method predicate. Re-execution may be delayed for a period of time to allow other threads access to shared resources. In another embodiment, if the blocking method's predicate evaluates to something other than "True", the system may make a decision about when to re-execute the method based on whether a change has occurred in some value in shared memory used to evaluate the predicate. The change of a shared memory value involved in the evaluation of the predicate indicates that the predicate may evaluate to "True" the next time it is evaluated. In yet another embodiment, the system may determine which thread that has affected shared memory may commit its changes, requiring any other threads using the shared memory to re-execute. Other means of evaluation and values of predicates that would indicate blocking or not blocking (for example, evaluating whether the predicate is "1" or "0" to determine whether to abort or proceed with the method), as well as other means and methods of determining if re-execution of threads is necessary and which threads should re-execute, are contemplated as within the scope of the present disclosure and would be recognized by those skilled in the art.

Examples of where the use of a blocking method would be helpful to the programmer include blocking the asynchronous method from executing to completion unless a file is successfully opened. Another example would be to block an asynchronous method from reading from a shared data structure until the data structure contains data (i.e. has a size greater than zero.) Yet another example would be to block an asynchronous method directing the movement of a character in a game until a certain amount of time has elapsed. Those skilled in the art will recognize that there are many useful applications of such a blocking method. All such applications are contemplated as within the scope of the present disclosure.

Figure 2:
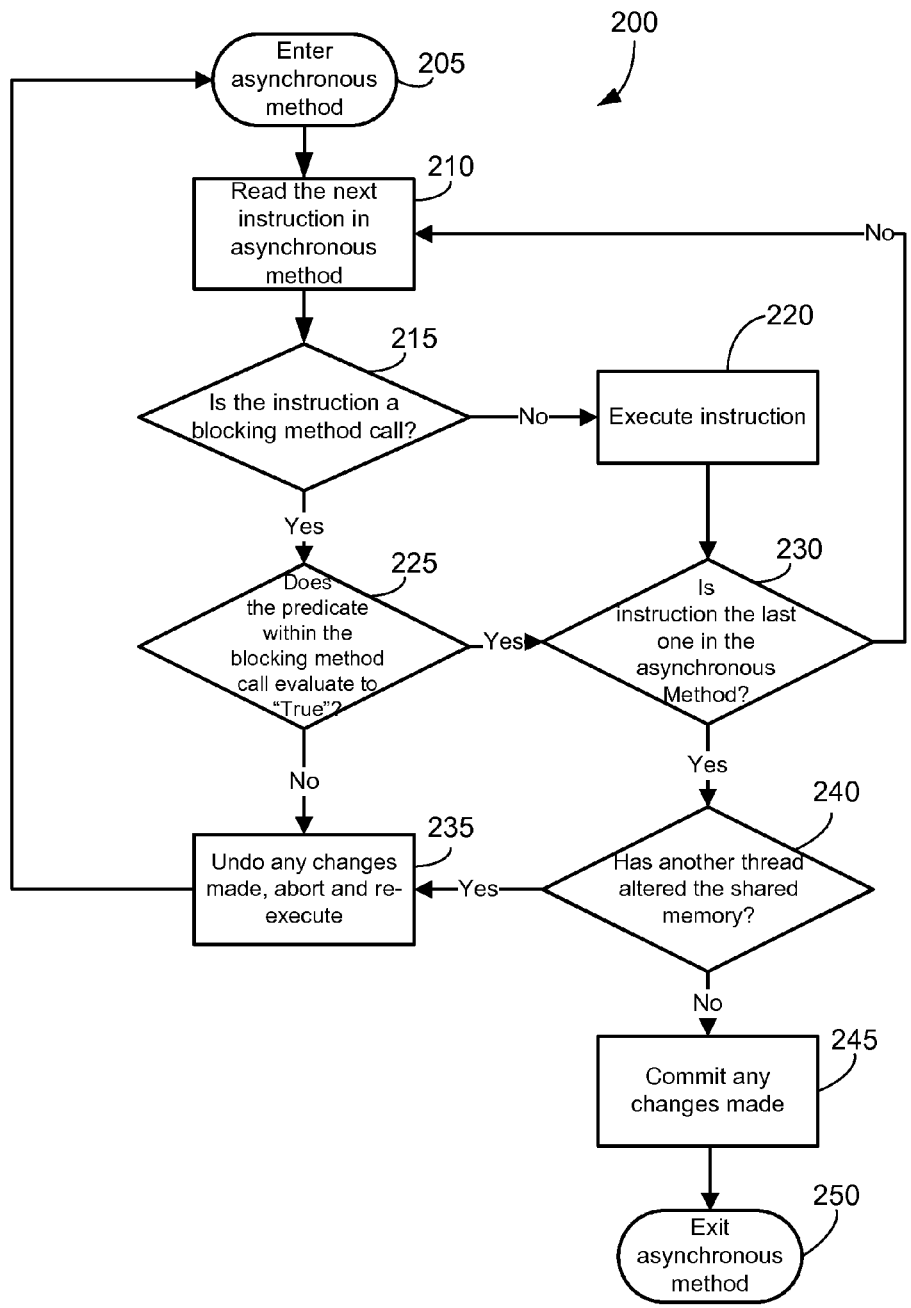
FIG. 2 is a flow diagram of a blocking method in use during the execution of an asynchronous method call.

FIG. 2 is a flow diagram of one non-limiting embodiment of a blocking method in use during execution of asynchronous method 200. Asynchronous method 200 is entered at step 205, and the first instruction is read at step 210. At step 215, the instruction is evaluated to determine if it is a blocking method call. If not, the instruction is executed at step 220. After the instruction is executed, it is determined at step 230 if the instruction was the last in the asynchronous method. If not, the next instruction is read, returning to step 210. If it is the last instruction, then the shared memory is evaluated to see if any changes have been made by other threads at step 240. If no changes have been made, the changes are committed at step 245, and the method 200 is complete at step 250. If changes have been made to the shared memory, then any changes made by method 200 are reversed at step 235, and the asynchronous method is re-executed, returning to step 205.

If it is determined at step 215 that the instruction is a blocking method call, then the predicate in the blocking method call is evaluated at step 225. If the predicate has a value of "True", execution of the method 200 continues. A determination is made at step 230 as to whether the blocking method call was the last instruction in the asynchronous method. If it was not the last instruction, the next instruction is read and the process continues at step 210. If it was the last instruction, then the shared memory is evaluated to see if any changes have been made by other threads at step 240. If no changes have been made, the changes are committed at step 245, and the method 200 is complete at step 250. If changes have been made to the shared memory by another thread, then any changes made by method 200 are reversed at step 235, and the asynchronous method is re-executed, returning to step 205. Returning again to step 225, if the value of the predicate as determined at step 225 is not equal to "True", then any changes made to the shared memory by asynchronous method 200 are reversed and the method 200 is aborted at step 235. The method 200 is then re-executed, returning to step 205. As will be recognized by those skilled in the art, use of the blocking method has the effect of preventing the calling asynchronous method from completing until the predicates of all blocking methods within the asynchronous method evaluate to "True".

Fragmented Asynchronous Methods

In some programs and embodiments, it may be desirable to further break down asynchronous methods into fragments that maintain the execution properties of event-based asynchronous methods as described above. These fragments may be referred to as atomic fragments. In one embodiment, an asynchronous method may be broken down by using a system method which attempts to commit the current shared memory state within an asynchronous method and begin executing the next atomic fragment. If unable to commit the shared memory state due to changes made in the shared memory by other threads, methods, or atomic fragments, the fragment is aborted and re-executed, much like an asynchronous method. This system method may be referred to as a yield method. A yield method serves as a boundary between atomic fragments. It allows the results of the previous atomic fragment to be made permanent, and begins the execution of the next atomic fragment. As in the Event-based Automatic Mutual Exclusion method described herein, the automatic mutual exclusion system may coordinate the timing and execution of atomic fragments and the queues which may be used for delayed and aborted fragments.

Calling a yield method within an asynchronous method will allow another asynchronous method to access the shared memory data in use by the yield-calling method. While this will allow for the possibility of a change in the shared data by another method, it will also allow for the change of state required by a blocking method (as described above) if a blocking method is used in proximity to the yield method. A yield method will also allow for more concurrency because the yield method allows other threads to perform actions on the shared memory while the calling asynchronous method is still executing. For instance, in a section of code where a blocking method is called to block execution of the asynchronous method until a certain amount of time has elapsed, inserting a yield method call will allow other threads to access the shared memory data while waiting for the appropriate amount of time to pass.

Figure 3:
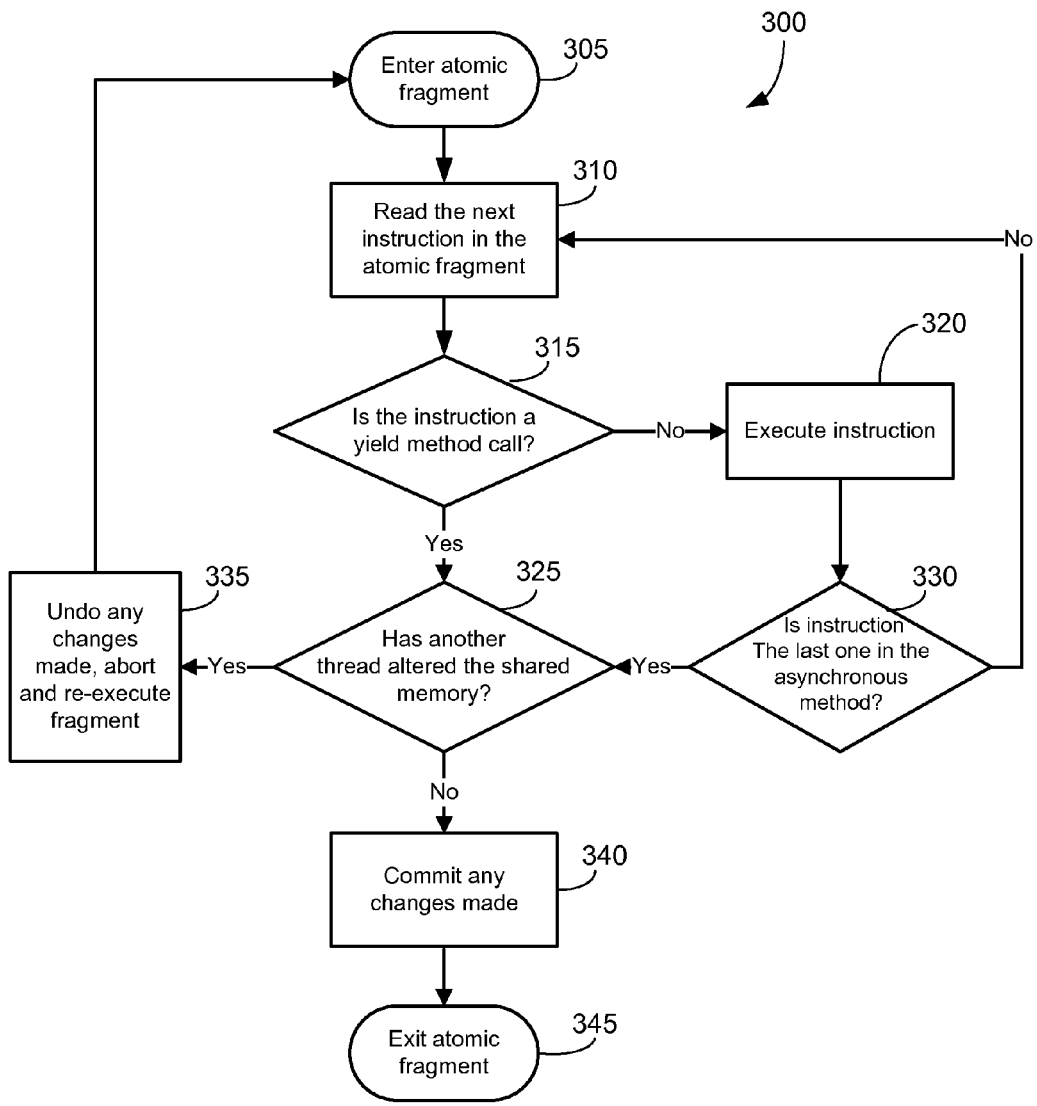
FIG. 3 is a flow diagram of a yield method in use during the execution of an atomic fragment.

FIG. 3 is a flow diagram of one non-limiting embodiment of a yield method in use during execution of atomic fragment 300. Atomic fragment 300 is entered and execution begins at step 305. Because an atomic fragment is a segment of an asynchronous method that is broken up by yield calls, atomic fragment 300 may be the set of instructions from the beginning of an asynchronous method to the first yield call, a set of instructions between yield calls, or the set of instructions from the last yield call to the end of the asynchronous method. The first instruction within atomic fragment 300 is read at step 310. At step 315, the instruction is evaluated to determine if it is a yield call. If the instruction is not a yield call, it is executed at step 320. Then a determination is made at step 330 on whether the instruction is the last one in the asynchronous method within which atomic fragment 300 is located. If not, the next instruction is read, returning to step 310. If the executed instruction is the last instruction in the asynchronous method, then a review of shared memory is performed to determine whether it has been altered by any other threads at step 325. If not, any changes made to shared memory are committed at step 340, and the atomic fragment is complete at step 345. If changes have been made to shared memory by another thread, then the changes made by atomic fragment 300 are reversed and the fragment is aborted at step 335, and re-executed, returning to step 305.

If, at step 315, the instruction is determined to be a call to a yield method, then a determination is made at step 325 as to whether the shared memory data has been changed by any other threads. If there have been no changes by other threads, then the changes made by atomic fragment 300 are committed at step 340, and the atomic fragment is complete at step 345. If there have been changes by other threads, then the changes made by atomic fragment 300 are reversed and the fragment is aborted at step 335, and re-executed, returning to step 305.

Atomic fragments and the yield system method can be used with the blocking system method described above. If a blocking method is called within an atomic fragment, and its predicate evaluates to false (or an equivalent value denoting the need to block the thread), only the atomic fragment is aborted and re-executed, rather than the entire asynchronous method. That is, only the instructions executed since the most recent yield method call are repeated. This further increases concurrency and efficiency of execution by repeating fewer instructions when blocking is used.

In one embodiment, the automatic exclusion system requires that any method containing a call to the yield method be explicitly labeled as such. A non-limiting example of labeling such a method is "void MethodName(Args) yields { . . . }". Another requirement that may be implemented in some embodiments is the labeling of a call to a method using a yield method to indicate that is has yielding instructions, such as "int foo=Method(x) yielding;". Use of such programming constructs may facilitate usability and ease of programming.

Unsynchronized Code

There will be times when a programmer needs to write code that is unsynchronized. Since all code included in an automatic mutual exclusion system is by default synchronized, it is necessary to specify any code which the programmer does not wish to be synchronized. Non-limiting examples of such code include low-level input/output calls and calls to legacy code. In one embodiment of the automatic mutual exclusion system, unsynchronized code is labeled "unprotected", and called within the body of block labeled accordingly, such as "unprotected {<unsynchronized instructions>}". The automatic mutual exclusion system will commit any changes to shared memory before executing unsynchronized code, and resume synchronization after the unsynchronized code execution is complete.

Those skilled in the art will recognize that there are many ways to implement programming systems and environments. It will be understood that many modifications of the present disclosure will be readily apparent to those skilled in the art, and this application is intended to cover any adaptations or variations thereof. All such programming systems and environments that incorporate the elements and spirit of the present disclosure are contemplated as within the scope of the present disclosure.

Exemplary Computing Environment

Figure 4:
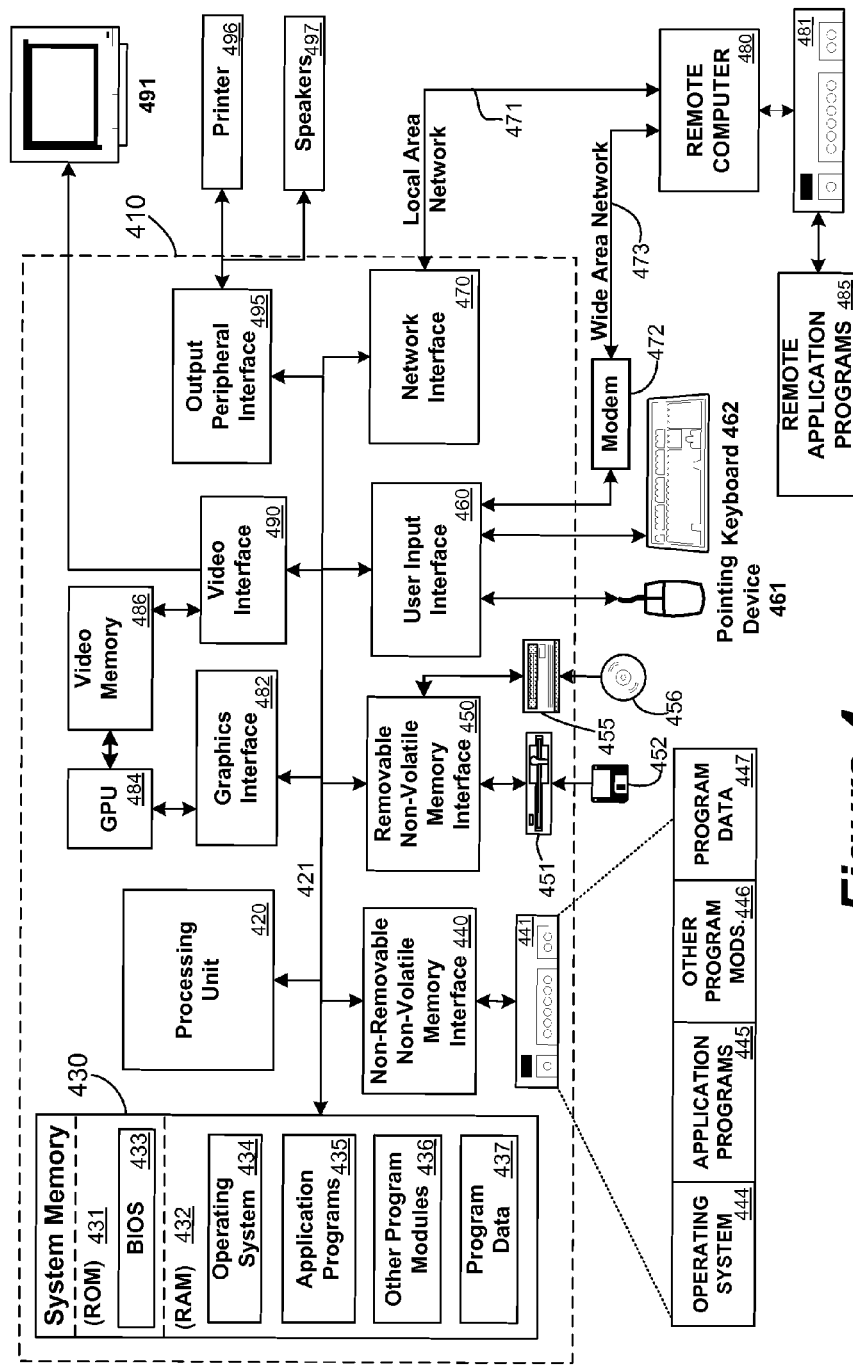
FIG. 4 is a block diagram representing an exemplary non-limiting computing device in which the present disclosure or parts thereof may be implemented.

FIG. 4 and the following discussion are intended to provide a brief general description of a suitable computing environment in which the present disclosure or parts thereof may be implemented. It should be understood, however, that handheld, portable and other computing devices and computing objects and devices of all kinds that are capable of being programmed are contemplated for use in connection with the present disclosure, as described above. Thus, while a general purpose computer is described below, this is but one example, and the present disclosure may be implemented with other computing devices, such as a thin client having network/bus interoperability and interaction. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may manipulated or stored using computer programs, or any device capable of executing computer instructions may be a desirable, or suitable, environment for implementation of the automatic mutual exclusion system of the disclosure.

Although not required, the present disclosure can be implemented via an operating system, for use by a developer of services for a device or object, and/or included within application software that operates in connection with a computer software programming environment. Software may be described in the general context of computer-executable instructions, such as program modules, being executed by one or more computers, such as client workstations, servers or other devices. Generally, program modules include methods, routines, programs, objects, components, data structures and the like that perform particular tasks or implement particular abstract data types. Typically, the functionality of the program modules may be combined or distributed as desired in various embodiments. Moreover, those skilled in the art will appreciate that the present disclosure may be practiced with other computer system configurations. Other well known computing systems, environments, and/or configurations that may be suitable for use with the present subject matter include, but are not limited to, personal computers (PCs), automated teller machines, server computers, hand-held or laptop devices, multi-processor systems, microprocessor-based systems, programmable consumer electronics, network PCs, appliances, environmental control elements, minicomputers, mainframe computers and the like. The disclosure may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4 thus illustrates an example of a suitable computing system environment 400 in which the present subject matter or parts thereof may be implemented, although as made clear above, computing system environment 400 is only one example of a suitable computing environment and is not intended to suggest any limitation as to the scope of use or functionality of the disclosure. The automatic mutual exclusion system, including methods such as asynchronous methods, blocking methods and yield methods may be contained within, or implemented using, a system such as computing system environment 400, but those skilled in the art will recognize that there are other appropriate systems in which to implement the present disclosure. Computing environment 400 should not be interpreted as having any dependency or requirement relating to any one or combination of components illustrated in the exemplary operating environment 400.

With reference to FIG. 4, an exemplary system for implementing the disclosure includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media, within which instructions for implementing the automatic exclusion system may be contained. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

Computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 441 is typically connected to the system bus 421 through a non-removable memory interface such as interface 440, and magnetic disk drive 451 and optical disk drive 455 are typically connected to system bus 421 by a removable memory interface, such as interface 450.

The drives and their associated computer storage media discussed above and illustrated in FIG. 4 provide storage of computer readable instructions, data structures, program modules and other data for computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to processing unit 420 through a user input interface 460 that is coupled to system bus 421, but may be connected by other interface and bus structures, such as a parallel port, game port or a universal serial bus (USB). A graphics interface 482 may also be connected to system bus 421. One or more graphics processing units (GPUs) 484 may communicate with graphics interface 482. In this regard, GPUs 484 generally include on-chip memory storage, such as register storage and GPUs 484 communicate with a video memory 486. GPUs 484, however, are but one example of a coprocessor and thus a variety of coprocessing devices may be included in computer 410. A monitor 491 or other type of display device is also connected to system bus 421 via an interface, such as a video interface 490, which may in turn communicate with video memory 486. In addition to monitor 491, computers may also include other peripheral output devices such as speakers 497 and printer 496, which may be connected through an output peripheral interface 495.

Computer 410 may operate in a networked or distributed environment using logical connections to one or more remote computers, such as a remote computer 480. Remote computer 480 may be a personal computer, a server, a router, a network PC, a peer device or other common network node, and typically includes many or all of the elements described above relative to computer 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, computer 410 is connected to LAN 471 through a network interface or adapter 470. When used in a WAN networking environment, computer 410 typically includes a modem 472 or other means for establishing communications over WAN 473, such as the Internet. Modem 472, which may be internal or external, may be connected to system bus 421 via user input interface 460, or other appropriate mechanism. In a networked environment, program modules depicted relative to computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for executing software utilizing shared memory space comprising:
    concurrently executing a first code segment and a second code segment;
    determining that a third code segment comprises a label indicating that the third code segment is unsynchronized;
    in response to determining that the third code segment comprises the label indicating that the third code segment is unsynchronized, committing changes made to a shared memory by the first code segment and the second code segment; and
    executing the third code segment.

2. The method of claim 1, further comprising, responsive to determining that the third code segment comprises the label indicating that the third code segment is unsynchronized, placing the third code segment in a queue.

3. The method of claim 2, wherein executing the third code segment comprises executing the third code segment from the queue.

4. The method of claim 1, wherein the third code segment comprises an input/output instruction.

5. The method of claim 1, wherein the shared memory is hardware transactional memory.

6. The method of claim 1, wherein the shared memory is software transactional memory.

7. The method of claim 1, wherein executing the third code segment comprises determining that the shared memory has been altered by at least one other code segment since the third code segment started executing, and, in response, reversing all changes made to the shared memory by the third code segment.

8. A system comprising:
    a memory comprising computer instructions; and
    at least one processor coupled to the memory, wherein, when executing the computer instructions, the at least one processor performs operations comprising:
        concurrently executing a first code segment and a second code segment;
        determining that a third code segment comprises a label indicating that the third code segment is unsynchronized;
        in response to determining that the third code segment comprises the label indicating that the third code segment is unsynchronized, committing changes made to a shared memory by the first code segment and the second code segment; and
        executing the third code segment.

9. The system of claim 8, wherein the operations further comprise, responsive to determining that the third code segment comprises the label indicating that the third code segment is unsynchronized, placing the third code segment in a queue.

10. The system of claim 9, wherein the operation of executing the third code segment comprises executing the third code segment from the queue.

11. The system of claim 8, wherein the third code segment comprises an input/output instruction.

12. The system of claim 8, wherein the shared memory is hardware transactional memory.

13. The system of claim 8, wherein the shared memory is software transactional memory.

14. The system of claim 8, wherein the operation of executing the third code segment comprises determining that the shared memory has been altered by at least one other code segment since the third code segment started executing, and, in response, reversing all changes made to the shared memory by the third code segment.

15. A computer-readable storage medium that is not a signal, the computer-readable storage medium comprising computer-executable instructions for performing operations comprising:

concurrently executing a first code segment and a second code segment;

determining that a third code segment comprises a label indicating that the third code segment is unsynchronized;

in response to determining that the third code segment comprises the label indicating that the third code segment is unsynchronized, committing changes made to a shared memory by the first code segment and the second code segment; and executing the third code segment.

16. The computer-readable storage medium of claim 15, wherein the operations further comprise, responsive to determining that the third code segment comprises the label indicating that the third code segment is unsynchronized, placing the third code segment in a queue.

17. The computer-readable storage medium of claim 16, wherein the operation of executing the third code segment comprises executing the third code segment from the queue.

18. The computer-readable storage medium of claim 15, wherein the third code segment comprises an input/output instruction.

19. The computer-readable storage medium of claim 15, wherein the shared memory is hardware transactional memory.

20. The computer-readable storage medium of claim 15, wherein the shared memory is software transactional memory.

* * * * *